Sept. 8, 1925.  R. FISCHBACH  1,552,833

VALVE

Filed Sept. 30, 1924

INVENTOR
RICHARD FISCHBACH
BY Richards & Geier
ATTORNEYS

Patented Sept. 8, 1925.

1,552,833

UNITED STATES PATENT OFFICE.

RICHARD FISCHBACH, OF BERLIN, GERMANY, ASSIGNOR TO SCHÄFFER & BUDENBERG, G. M. B. H., OF BUCKAU, NEAR MAGDEBURG, GERMANY.

VALVE.

Application filed September 30, 1924. Serial No. 740,726.

*To all whom it may concern:*

Be it known that I, RICHARD FISCHBACH, a subject of the German Republic, residing at 24 Gaudystrasse, at Berlin, Germany, have invented new and useful Improvements in Valves, of which the following is a specification.

The greater part of the known closing devices for valves and the like are constructed in such a manner, that the closing member proper, which may be a conical valve or a sliding member, obtains its motion or drive by the rotation of a threaded spindle. This spindle is guided by a guiding member or bridge, which is rigidly connected with the cover of the valve casing and provided with an interior thread or with a nut which is inserted in the casing. The rotation of the threaded spindle, when opening or closing the valve, will require a longer or shorter time according to the size of the closing member and the pitch of the thread.

To obtain safety of operation and for other reasons, in many cases of operation it is required to impart to the closing member of the valve a great velocity when moving the same to its closed or open position. A motor drive, which for this purpose had sometimes been applied to the threaded spindle, could only serve the desired purpose in an imperfect manner. With a motor-driven spindle there will always be required a time from one and one half to two minutes in order to close or open the valve, which time must be regarded as much too long in case of danger. Besides, the motor drive will be relatively expensive and further requires the presence of electric current for its operation.

This invention is designed to operate valves having a threaded spindle as an operating member, not only in the ordinary way of slowly opening and closing within a time depending on the normal operation of the spindle, but also in any desired time, which may be chosen according to suddenly arising danger or other conditions, without, however changing the position of the threaded spindle relatively to its nut or guiding member. While for this purpose it had been proposed to employ a special collapsible brace for the nut of the spindle, according to this invention the bridge of the valve is made collapsible in the form of toggle-joints.

Figure 1:
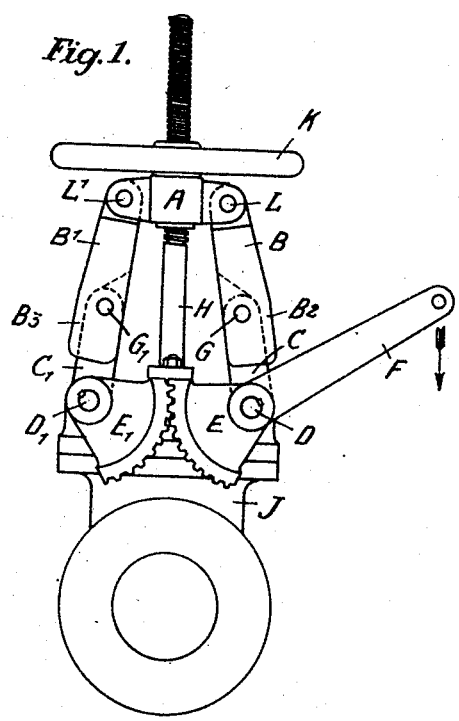
Figure 2:
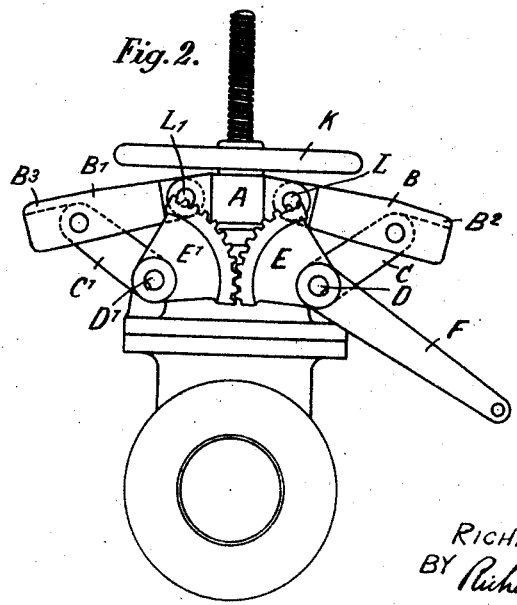

In the accompanying drawing a preferred form of the valve according to this invention is shown, Fig. 1 representing a side elevation of the closing device with the parts in the position assumed when the closing member is in open position, and Fig. 2 being also a side-view, the several parts of the valve being in their position after quick closure of the same.

According to this invention the braces B and B¹, which in the known constructions are rigidly connected with the bridge A and the cover of the valve casing, are arranged in the form of toggle-joints. The lower shanks C and C¹ of these toggle-joints are firmly mounted upon short shafts D and D¹ and are therefore in rigid connection with the hand lever F, which is fixedly mounted upon the shaft D. The shafts D and D¹ also carry two cog-wheel segments E and E¹ respectively. The upper ends of the lower shanks C and C¹ are positioned in proper recesses of the upper shanks B and B¹ and will push against the rear walls B² and B³ of the recesses, when in extended condition, as shown in Fig. 1, so that it will not be possible, to bend the toggle-joint in an inward direction. Both toggle-joints, however may be broken outwardly, as shown in Fig. 2, by a downward swinging motion imparted to the hand lever as indicated in Figure 1. The pivotal points G and G¹, by reason of the rigid connection between the under shanks C and C¹, the shafts D and D¹, and the cog-wheel segments E and E¹, will move downwardly and apart in lateral direction when pulling down the hand-lever. A pull is thus exerted upon the bridge A by means of the upper shanks B and B¹, of the toggle-joint construction, which pull will act uniformly on two opposed sides of the threaded spindle H in such manner that said spindle, engaged by the bridge A, will be downwardly moved exactly in axial direction without any lateral strain in the stuffing box. Thus the closing member, which is provided in the interior of the casing J and connected with the spindle H, will be brought to closing position, no matter whether this closing member is a conical or a sliding one. The several parts of the valve will then be in the position shown in Fig. 2.

The exactly axial motion of the threaded spindle within the stuffing box will be accomplished by the fact, that the two toggle-joints B, C and B¹, C¹ are brought in positive connection with each other through the cog-wheel segments E and E¹.

It will thus be possible by a downward motion of the lever F to bring the closing member into its closed position in a very short time.

By upward motion of the hand-lever F the valve may, in like manner, be as quickly opened.

The return motion of the toggle-joints and of the parts which are positively connected therewith may, however, also be slowly effected by a rotation of the hand-wheel K. The latter will thereby be screwed upon the spindle in upward direction, until the toggle-joints assume the extended position shown in Fig. 1. The closing member, however, has remained in closed position during the rotation of the hand-wheel. If now the hand-wheel, after the toggle-joints have come into their extended position, is rotated in opposite direction, the spindle H will be raised thereby bringing the closing member into its open position. All parts will then again assume the position shown in Fig. 1.

Since the toggle-joints can only be moved from their extended position by swinging the hand-lever F, and not by a rotation of the hand-wheel K, their pivotal points D, G, L and D¹, G¹, L¹ being positioned in planes one above the other, the toggle-joints will act in extended position exactly in the same manner as the known bridge braces on the cover of the casing, if the hand-wheel is used for the operation of the closing member.

According to this invention, therefore, one and the same closing member may be used entirely at will for slow or quick closing.

The cog-wheel segments E and E¹ may of course be replaced by other elements of construction, which are able to establish a positive connection between these two toggle-joints.

Regarding the construction of the toggle-joints changes may also be made without departing from the spirit of this invention. Thus, for instance for valves of greater dimensions the toggle-joints may be composed of more than two shanks.

I claim:

1. Valve operating mechanism for quick and slow acting valves including, in combination, a threaded spindle, a closing member carried thereby, a guiding member through which said spindle is threaded, means for rotating the spindle to slowly move said closing member to open and closed positions, and means connected to said guiding member for rapidly moving said closing member to open and closed positions, said means being operable to move the closing member to closed position regardless of whether the same had previously been moved to open position by the rotation of the spindle or by the last named means.

2. Valve operating mechanism for quick and slow acting valves including, in combination, a threaded spindle, a closing member carried thereby, a guiding member through which said spindle is threaded, means for rotating the spindle to slowly move said closing member to open and closed positions, toggle joints connected to opposite sides of said guiding member for rapidly moving said closing member to open and closed positions, said toggle joints being operable to move the closing member to closed position regardless of whether the same had previously been moved to open position by the rotation of the spindle or by said toggle joints, and means for operating said toggle joints in unison so that said spindle and closing member will be moved only in a line coincident with the axis of the spindle.

3. Valve operating mechanism for quick and slow acting valves including, in combination, a threaded spindle, a closing member carried thereby, a guiding member through which said spindle is threaded, means for rotating the spindle to slowly move said closing member to open and closed positions, toggle joints connected to opposite sides of said guiding member for rapidly moving said closing member to open and closed positions, said toggle joints being operable to move the closing member to closed position regardless of whether the same had previously been moved to open position by the rotation of the spindle or by said toggle joints, means for operating said toggle joints in unison so that said spindle and closing member will be moved only in a line coincident with the axis of the spindle, and a pivoted operating element for actuating the last named means.

In testimony whereof I have signed my name to this specification.

RICHARD FISCHBACH.